United States Patent [19]
Gruenman et al.

[11] 3,923,833
[45] Dec. 2, 1975

[54] N-[(1-CYANO-2-PHENYL)ETHYL]CARBAMATES

[75] Inventors: Vsevolod Gruenman, Montclair; Max Hoffer, Nutley, both of N.J.

[73] Assignee: Hoffmann-La Roche Inc., Nutley, N.J.

[22] Filed: Feb. 7, 1974

[21] Appl. No.: 440,638

Related U.S. Application Data

[60] Division of Ser. No. 184,950, Sept. 29, 1971, abandoned, which is a division of Ser. No. 13,769, Feb. 24, 1970, Pat. No. 3,636,039, which is a continuation-in-part of Ser. No. 725,946, May 1, 1968, abandoned.

[52] U.S. Cl. ...... 260/340.5; 260/309.7; 260/465 D; 260/471 C; 260/570.5 P; 424/273
[51] Int. Cl.² .............. C07C 121/66; C07D 317/60
[58] Field of Search ................... 260/340.5, 465 D

[56] References Cited
UNITED STATES PATENTS
2,710,851  6/1955  Boyd .............................. 260/465 D
3,641,097  2/1972  Hegedus et al. ................ 260/465 D

OTHER PUBLICATIONS

Gaudry et al., Chemical Abstracts, 38:2026-3, (1944).

Boots et al., Heterocycl. Chem., 4(2), pp. 272-83.

Primary Examiner—Lorraine A. Weinberger
Assistant Examiner—Michael Shippen
Attorney, Agent, or Firm—Samuel L. Welt; Bernard S. Leon; William G. Isgro

[57] ABSTRACT

The present disclosure relates to novel benzylimidazolidinones, with special reference to the 4-(substituted benzyl)-2-imidazolidinones, methods for their preparation and novel intermediates useful therein. The benzylimidazolidinones are useful as hypotensive agents.

1 Claim, No Drawings

N-[(1-CYANO-2-PHENYL)ETHYL]CARBAMATES

This is a division, of application Ser. No. 184,950 filed Sept. 29, 1971, now abandoned, which in turn is a division of U.S. Patent application Ser. No. 13,769, filed Feb. 24, 1970, now U.S. Pat. No. 3,636,039, issued Jan. 18, 1972, which in turn is a continuation-in-part of Ser. No. 725,946, filed May 1, 1968, now abandoned.

BRIEF DESCRIPTION OF THE INVENTION

The present invention relates to new substituted benzylimidazolidinones which contain oxygenated substituents in the phenyl ring. Such compounds have been found to exhibit significant hypotensive activity.

The compounds of this invention may be represented by the following formula

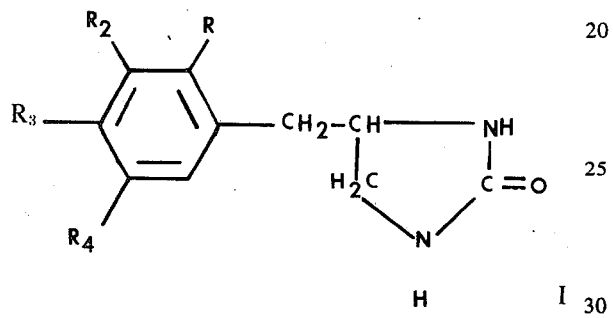

in which

R is halogen, hydrogen, lower alkyl and lower alkoxy and $R_2$, $R_3$, and $R_4$ taken independently of each other are hydrogen, hydroxy, lower alkoxy and hydroxy-lower alkoxy and R, $R_2$, $R_3$ or $R_4$ taken as an adjacent pair is alkylenedioxy.

In a preferred embodiment of the present invention with respect to compounds corresponding to formula I above, there is included those compounds wherein R is hydrogen or halogen, preferably bromine or chlorine and $R_2$, $R_3$ and $R_4$ taken independently of each other represent at least one oxygenated substituent, e.g., hydroxy or lower alkoxy. In an embodiment of greater preference, R is hydrogen or halogen as above, and $R_2$, $R_3$, and $R_4$ taken independently represent at least two lower alkoxy groups. A most preferred embodiment of the present invention consists of compounds of formula I wherein R and $R_4$ are hydrogen, $R_2$ and $R_3$ are both lower alkoxy, the same or different.

In a preferred embodiment of the present invention with respect to compounds corresponding to formula I above, R, $R_2$, $R_3$ and $R_4$ are taken as an adjacent pair and such adjacent pair is methylenedioxy.

By the term "lower alkyl" and "lower alkoxy" where used herein both straight and branched chain hydrocarbon and hydrocarbonoxy groups having 1–7, preferably 1–4 carbon atoms in the chain are intended. The term "halogen" where used herein shall mean bromine, chlorine and iodine, preferably bromine and chlorine.

The compounds of formula I above exist as racemic forms as well as optically active D and L isomers. It is intended to include in this invention the racemic mixture of these isomers as well as the resolved D and L forms.

In one aspect of the present invention, 4-(substituted Benzyl)-2-imidazolidinones represented by the following formula:

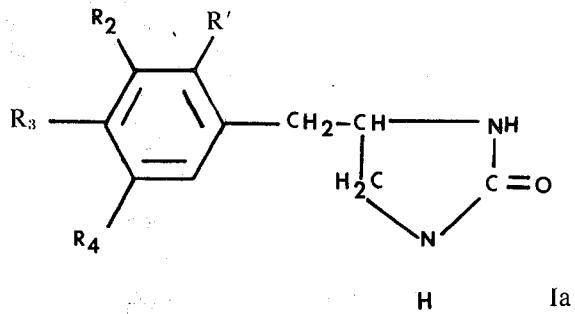

in which

R' is hydrogen, lower alkyl and lower alkoxy and $R_2$, $R_3$ and $R_4$ are as above, may be prepared, for example, by treating carbamates corresponding to general formula II below with a compound of the formula MOH wherein M is an alkali metal cation, in the presence of water or a lower alkanol.

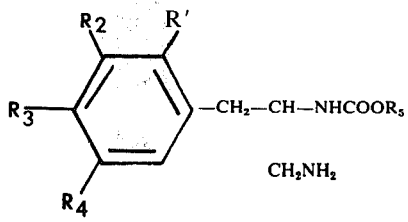

where

R', $R_2$, $R_3$ and $R_4$ are as above and $R_5$ is lower alkyl.

The temperature and pressure at which the conversion of a compound of the formula II above into a compound of the formula Ia above is not critical. Generally, temperatures within the range of from about 20° to 120°C. are operable, with a temperature range of about 80° to 100°C. being preferred. The reaction is most conveniently carried out at atmospheric pressure but pressures at slightly above or below atmospheric pressure may also be used. Choice of solvent is also not critical and any inert solvent, whether organic or inorganic, in which compound MOH is soluble will be operable. Suitable solvents, for example, include the lower alkanols, water, glycols, dioxans, tetrahydrofuran, dimethylformamide, and dimethylsulfoxide. Preferred solvents include the lower alkanols, e.g., methanol and ethanol, and water.

In another reaction path leading from compounds of formula II to corresponding compounds of formula Ia, a compound of the formula II above is first treated with an aqueous acidic hydrolyzing agent, such as a strong mineral acid, e.g., a hydrohalic acid such as hydrochloric acid or hydrobromic acid, or sulfuric, phosphoric, or polyphosphoric acids to yield the corresponding diamine of the formula III below.

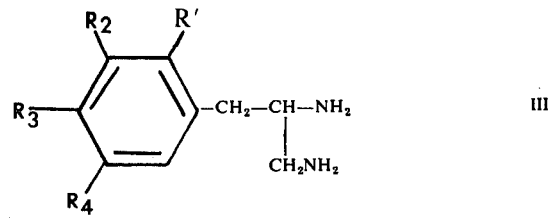

where
R', $R_2$, $R_3$, and $R_4$ are as above.

It should be noted that when alkoxy substituents are present in the starting carbamate of general formula II and hydrobromic acid is applied as the hydrohalic acid, then the resulting product of formula III will generally be obtained with hydroxy substituents corresponding to the original alkoxy groups. On the other hand, the use of hydrochloric acid in the above reaction sequence will generally preserve the original alkoxy substituents in the resulting formula III compounds.

It should further be noted that the intermediates corresponding to formula II and formula III above are novel compounds and therefore constitute part of the present invention. In addition to being useful as intermediates in the preparation of compounds of the formula Ia above, compounds of formula III above have been found to exhibit cardiovascular activity and hence can function as hypertensive agents.

The compounds of formula III above may abe converted, if desired, to imidazolidinone products of formula Ia above by reacting them with phosgene in an inert organic solvent, preferably an aromatic hydrocarbon solvent, e.g., toluene. The reaction scheme employed in converting the carbamate of formula II to the imidazolidinone of formula Ia via the diamine of formula III in a preferred aspect is summarized below in the following reaction sequence.

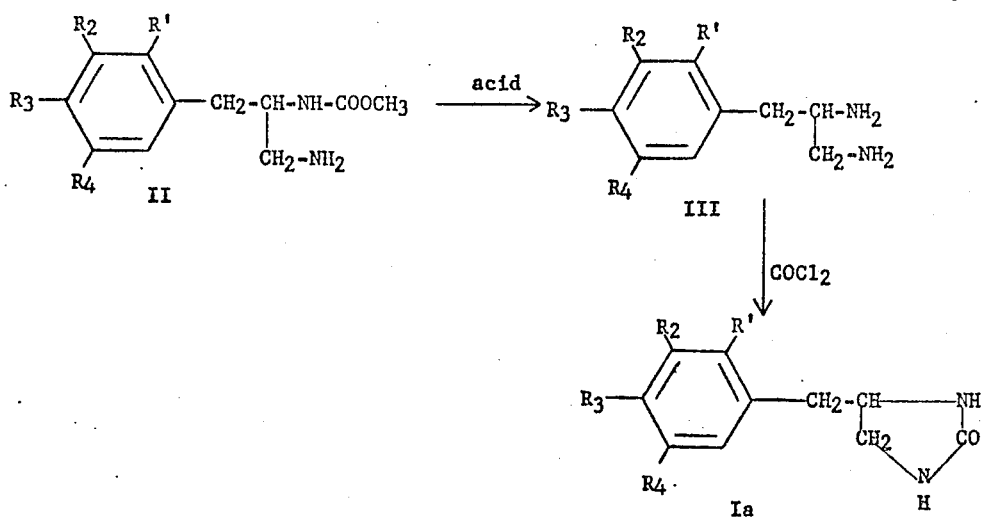

where
R', $R_2$, $R_3$ and $R_4$ are as above.

The compounds of formula III above may also be obtained as salts of pharmaceutically acceptable acid groups. Such salts may be either the single or double salt, i.e., forming with one or both of the free amine groups. Examples of such salts include the pharmaceutically acceptable organic and inorganic acid salts, such as hydrochloric acid, hydrobromic acid, nitric acid, sulfuric acid, acetic acid, formic acid, succinic acid, maleic acid, p-toluene sulfonic acid and the like. These salts may be prepared by methods well known in the art.

The compounds of formula II and formula III above may exist in optically active form. It is intended to include in this invention both the resolved D or L isomers as well as racemic mixtures thereof. The optical isomers of compounds of formula III may be conveniently obtained by resolution of the corresponding carbamate compound of formula II followed by acid hydrolysis thereof.

The carbamates corresponding to formula II above are prepared most conveniently by means of a reaction path starting with cyanocinnamic acid esters corresponding to the following general formula:

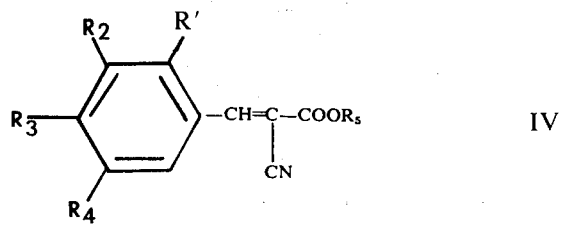

where
R', $R_2$, $R_3$, $R_4$ and $R_5$ are as above.

The aforesaid reaction path involves, as a first step, hydrogenation of compounds corresponding to formula IV in the above in the presence of catalyst systems conventionally used in the art to hydrogenate ethylenic groups thus producing in the present instance the corresponding dihydro cinnamonitrile. Such catalysts include for example, the noble metals. Preferred among the noble metals as catalysts to be used herein are the platinum group metals, most preferably palladium. The noble metal catalyst may be supported on a conventional catalyst support material, e.g., charcoal. Thus, palladium on charcoal represents an especially preferred embodiment of the hydrogenation catalyst.

The hydrogenation step above may conveniently be carried out at room temperature although higher and lower temperatures may be employed if desired. Hydrogen pressures in the range between about atmospheric to 1,000 lb. psig, preferably in the range between about 500 to 800 psig are used. The hydrogenation is continued until a theoretical amount of hydrogen has been absorbed.

The hydrogenated product obtained above is then reacted with hydrazine to yield the corresponding acid hydrazide of the formula V below.

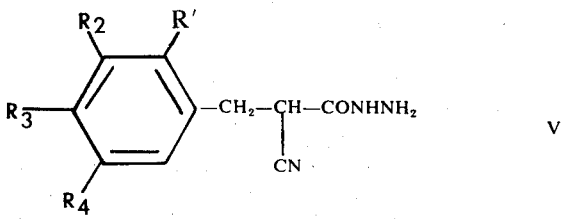

where
R', $R_2$, $R_3$ and $R_4$ are as above.

The acid hydrazides of formula V above are novel compounds and therefore constitute part of the present invention. They are useful intermediates in the preparation of compounds of formula I and formula III, which compounds exhibit useful pharmacological activity.

The acid hydrazide of formula V above is then decomposed to the corresponding methyl carbamate of formula VI below without isolation of the intermediate azides by utilizing a modified Curtius reaction. The modification of the Curtius Reaction used in this embodiment of the present invention employs a nitrous acid prepared in situ from a nitrite salt, e.g., sodium nitrite, potassium nitrite, calcium nitrite, etc. and a strong mineral acid, preferably sulfuric acid, to convert compounds of formula V above to the corresponding azides. The said azides are then converted directly, without isolation, into the desired methyl carbamate of formula VI below by treatment with absolute methanol, preferably at reflux conditions.

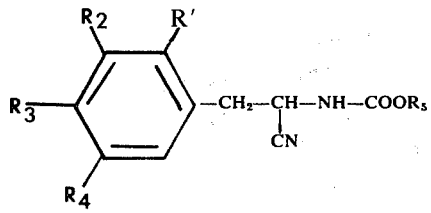

VI where
R', $R_2$, $R_3$, $R_4$ and $R_5$ are as above.

Compounds of the formula VI above are novel compounds and therefore constitute part of the present invention. They are useful intermediates in the preparation of compounds of formulas I and III, which compounds are pharmacologically useful.

Compounds of the formula VI above are converted to compounds of the formula II above by hydrogenation utilizing as catalyst. Suitable Raney metal catalysts include Raney cobalt and Raney nickel, Raney cobalt being the catalyst of preference. It is desirable to have an organic base present during the aforesaid hydrogenation reaction. Suitable organic bases include the organic amines and more preferably the poly-lower alkyl amines. A most preferred embodiment of the present invention utilizes triethylamine.

The aforesaid hydrogenation may be conducted in a suitable inert solvent such as a lower alkanol, e.g., methanol, ethanol, and isopropanol. Methanol is the solvent of preference. pressures utilized will generally be in the range between about 300 to 1,500 psig, more preferably in the range between about 500 to 1,000 psig. Temperatures for the said hydrogenation will be in the range of from about 50° to 150°C., more preferably in the range between about 100° to 110°C.

Since halogen substituents in the 2-position of the phenyl ring of compounds of the formula VI above may abe labile under the hydrogenation conditions employed in converting formula VI compounds to compounds of formula II, the insertion of such halogens to produce compounds of the formula I where R is halogen will best be done in a step subsequent to the hydrogenation step. Therefore, compounds of formula I where R is halogen will be prepared in accordance with the present invention by halogenating a compound of formula Ia wherein R' is hydrogen by procedures hereinafter described.

Halogenation of the compound of formula Ia above where R' is hydrogen involves treating such compounds with a halogenating agent in a suitable inert solvent at a temperature in the range of from about 0° to 100°C., preferably in the range from about 20° to 30°C. Suitable halogenating agents include, for example, the halogens themselves, e.g., chlorine, bromine, iodine, or a compound having an active halogen such as, for example, sulfuryl chloride. The inert solvents useful in halogenation above include, for example, water, chlorinated hydrocarbons and organic acids, particularly the lower fatty acids. Nonlimiting examples of the latter two groups include chloroform, trichloroethane and acetic acid.

The halogenated product corresponds to formula Ib below. For purposes of convenience, the designations of formula Ia and formula Ib are combined in forming the generic formula corresponding to compound I.

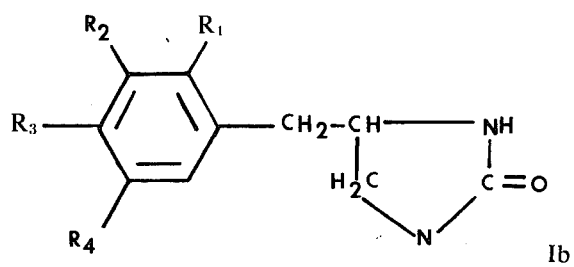

Ib where
$R_1$ is halogen and $R_2$, $R_3$, and $R_4$ are as above.

The compounds of the present invention corresponding to formula Ia above may also be prepared from the diamines of formula III by an alternative pathway. In this embodiment of the present invention the diamine of formula III above is treated with chloroethyl carbamate to give a diurethane corresponding to formula VII below:

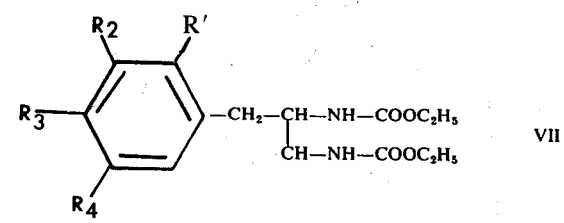

VII where
R', $R_2$, $R_3$ and $R_4$ are as above.

The dicarbamate of formula VII is cyclized to yield compounds of formula Ia by prolonged heating with ethanolic sodium ethylate solution. The dicarbamates of formula VII above are novel compounds and therefore constitute part of the present invention. They are useful as intermediates in the preparation of compounds of formula I. The compounds of formula Ia which contain one or more hydroxyl moieties can be alkylated. Such alkylation can be effected utilizing known procedures, such as, by reaction with dialkyl sulfates or alkyl halides.

As a matter of convenience, the aforesaid series of reactions are summarized below in the following reaction sequence which indicates the various process embodiments of the present invention:

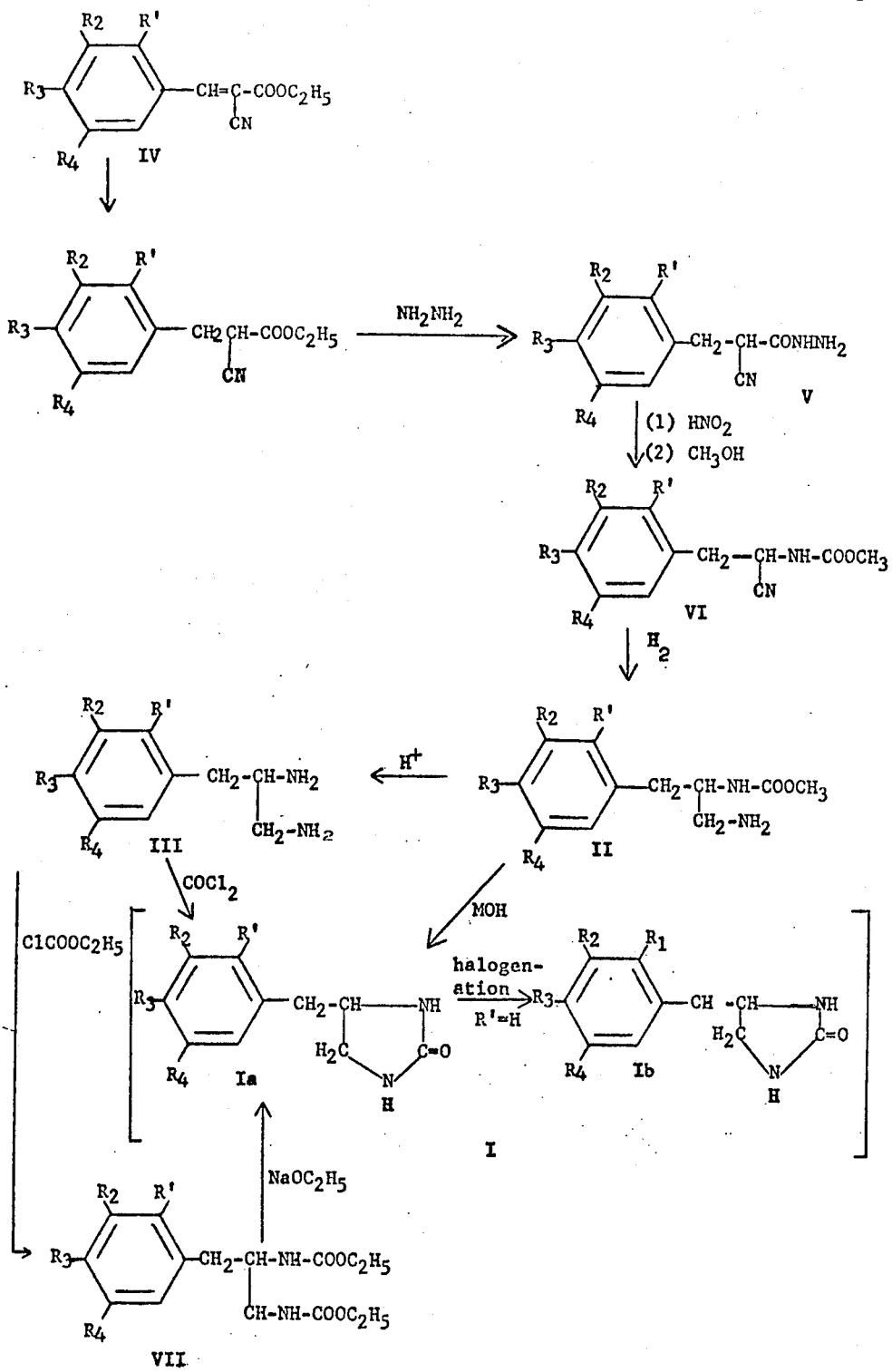

As indicated previously, the compounds corresponding to formula I above can exist in optically active forms. However, these compounds cannot conveniently be resolved into their optically active components since they do not form acid addition salts. Intermediates corresponding to formula II above do form salts and thus resolution of such compounds may be readily performed. As was indicated in the above scheme, compounds corresponding to formula II may then be converted into compounds corresponding to formula I by treating with aqueous or alcoholic alkali. Such treatment preserves the configuration about the optical centers and this technique provides a convenient path to the corresponding optically active antipodes of compounds corresponding to formula I above.

Resolution of compounds of the formula II above can be obtained by utilizing an optically active acid which will form a salt with the free amino group. Suitable optically active acids for this purpose include those which form crystalline salts with compounds of formula II. Of the foregoing, d-10-camphorsulfonic acid is preferred. The diasteromeric carbamate d-10-camphorsulfonates are readily separable by fractional crystallization. The desired optical antipodes of the product imidazolidinones of formula I are obtainable directly from the separated diastereomers by warming the salts with alkali at conditions previously described for the cyclization of the carbamate. The most preferred compounds of formula I is
d,l-4-(3-ethoxy-4-methoxybenzyl)-2-imidazolidinone.

Compounds which correspond to formula I above which are generally preferred in the present invention are exemplified by the following:

d,l-4-(3-methoxy-4-ethoxybenzyl)-2-imidazolidinone
d,l-4-(3-butoxy-4-methoxybenzyl)-2-imidazolidinone
d,l-4-(2-chloro-4,5-dimethoxybenzyl)-2-imidazolidinone
d,l-4-(2-bromo-4,5-dimethoxybenzyl)-2--imidazolidinone
d,l-4-(2-methyl-4,5-dimethoxybenzyl)-2-imidazolidinone
d,l-4-(2,4,5-trimethoxybenzyl)-2-imidazolidinone
d,l-4-(3,4-dimethoxybenzyl)-2-imidazolidinone
d,l-4-(3,4,5-trimethoxybenzyl)-2-imidazolidinone
d,l-4-(3-methoxybenzyl)-2-imidazolidinone
d,l-4-(4-methoxybenzyl)-2-imidazolidinone
d,l-4-Piperonyl-2-imidazolidinone
d,l-4-(2,3-dimethoxybenzyl)-2-imidazolidinone
d,l-4-(3,4-dihydroxybenzyl)-2-imidazolidinone
d,l-4-(3-hydroxybenzyl)-2-imidazolidinone and the $d$ and $l$ optical antipodes of the above compounds.

With respect to the novel intermediates of formula II above, the following compounds are to be considered preferred species thereunder:

d,l-methyl-($\alpha$-aminomethyl-3,4-dimethoxyphenylethyl) carbamate
d,l-methyl-($\alpha$-aminomethyl-3,4,5-trimethoxyphenethyl) carbamate
d,l-methyl-($\alpha$-aminomethyl-3-methoxyphenethyl) carbamate
d,l-methyl-($\alpha$-aminomethyl-2,3-dimethoxyphenethyl) carbamate
d,l-methyl-($\alpha$-aminomethyl-2,3-methylenedioxyphenethyl) carbamate the $d$ and $l$ optical antipodes and the pharmaceutically acceptable, non-toxic acid addition salts of the above compounds.

Turning now to the novel intermediates of formula III above, the following compounds are to be considered preferred species thereunder:

d,l-3-(3-hydroxyphenyl)-2-aminopropylamine
d,l-3-(3,4-dihydroxyphenyl)-2-aminopropylamine
d,l-3-(2,3-dihydroxyphenyl)-2-aminopropylamine
d,l-3-(3,4,5-trihydroxyphenyl)-2-aminopropylamine and the $d$ and $l$ optical antipodes and the pharmaceutically acceptable, non-toxic salts of the above compounds.

With respect to the optical antipodes of the compounds of formula II above, these compounds are obtainable by acid hydrolysis of the corresponding imidazolidinone compounds using a hydrohalide acid. As indicated previously, if HBr is utilized as the acid and alkoxy substituents are present on the aromatic ring of the imidazolidinone compound, the resulting product will generally be the corresponding hydroxy substituted diamine.

In the interest of brevity, the corresponding groups of preferred compounds for novel intermediates corresponding to formulas V, VI and VII shall not be separately listed. However, it should be understood that those compounds within the aforesaid formulas which correspond to compounds indicated to be preferred for the purposes of the present invention shall also be considered to be preferred species within such groups of intermediate compounds.

The compounds of formula I have been found to lower blood pressure and cause vasodilation. More particularly, they effect increase in the peripheral vascular blood flow with a decrease in peripheral vascular resistance without any substantial inhibition of the peripheral autonomic system and with only minimal blocking effects upon the adrenergic effector sites. Moreover, the compounds of formula I possess the advantage of being devoid of certain undesirable effects, for instance, they do not significantly increase the heart rate in unanesthetized dogs. Thus, the compounds of the present invention are useful for example, in the treatment of vascular diseases such as hypertension.

In direct contrast thereto, the compounds of formula III raise blood pressure. Additionally, strong hypertensive activity is demonstrated in response to serotonin, vagus stimulation, carrotis occlusion, hypertensine, N-epinephrine, and histamine screening tests. Thus, the compounds of formula III are useful, for example, in the treatment of vascular diseases such as hypertension.

For use as cardiovascular agents, the novel compounds of formulas I and III are formulated using conventional inert pharmaceutical adjuvant materials, into dosage forms which are suitable for oral or parenteral administration. Such dosage forms include, tablets, suspensions, solutions, etc. Furthermore, the compounds of this invention can be embodied into and administered in the form of suitable, hard or soft capsules. The identity of the inert adjuvant materials which are used in formulating the present compounds into oral and parenteral dosage forms will be immediately apparent to persons skilled in the art. These adjuvant materials, either inorganic or organic in nature, include, for example, water, gelatin, lactose, starch, magnesium stearate, preservatives, stabilizers, wetting agents, emulsifying agents, salts for altering osmotic pressure, buffers, etc. can be incorporated, if desired, into such formulations.

The quantity of active ingredient which is present in any of the above-described dosage forms is variable. It is preferred, however, to provide a daily dosage in the range of from about 25mg. to about 600 mg. of the formla I compound generaly in divided doses.

Similarly, when employing compounds of formula III as the active ingredient, it is preferred to provide a daily dosage from about 10 mg. to about 100 mg. of the formula III base or an equivalent amount of a pharmaceutically acceptable acid addition salt thereof generally in divided doses.

The above dosage figures are in no way critical and should, of course, be adjusted according to the best judgment of the person administering the compound and depending on the result desired, the method of administration and the reason for which the compound is being administered.

The following non-limiting examples further illustrate the invention. All temperatures are in °C.

EXAMPLE 1

Preparation of 3-n-butoxy-4-methoxybenzaldehyde

To a solution of 17.2 g. (0.75 atom) of sodium and 270 ml. of ethanol there was added with stirring 114 g. of isovanilline. A sodium salt of the isovanilline precipitated. 173 g. (0.94 mol) of 1-iodobutane was added with stirring and the mixture refluxed for 18 hours. The reaction mixture was poured into 1,900 ml. of water, and the precipitated oil taken up in 300 ml. of benzene. The aqueous layer was repeatedly extracted six times with 100 ml. of benzene, and the combined benzene extracts washed with 1.5N aqueous sodium hydroxide solution, 6 times each 100 ml., finally with 100 ml. water, 36 g. unreacted isovanilline was recovered by acidifying the combined aqueous layer with 10 N sulfuric acid and extraction with methylene chloride. The benzene layers containing the product were evaporated in vacuo in a water bath and the residue was vacuum distilled, having a boiling point of 149°–150°/5 mm., melting point 39°–40°, $n_D^{22} = 1.5969$ to yield 101 g. (94.5%) of 3-n-butoxy-4-methoxybenzaldehyde; conversion yield 65 percent.

$C_{12}H_{16}O_3$: Calcd: C, 69.2; H, 7.68. Found: C, 69.53; H, 7.57.

EXAMPLE 2

Preparation of 3-isopropoxy-4-methoxybenzaldehyde

To a solution of 17.2 g. (0.25 ml.) of sodium in 375 ml. of ethanol, there was added 114 g. (0.75 mol.) of isovanilline and subsequently 160 g. (0.95 mol.) of 2-iodopropane. The experiment gave in analogy to exp. 9, 3-isopropoxy-4-methoxybenzaldehyde, as an oil having a boiling point 3 mm. of 130° $n_D^{22} = 1.5549$ in a yield of 69.5 g. Recovery of isovanilline 35 g.

$C_{11}H_{14}O_3$: Calcd: C,68.1; H, 7.22, Found: C, 67.94; H, 7.14.

EXAMPLE 3

Preparation of 3-hydroxyethoxy-4-methoxybenzaldehyde 152 g. (1 mol) of isovanilline, 500 ml. of chloroethanol and 5 g. of potassium iodide were heated under stirring to reflux and 205 g. (1.5 mol) dry powdered potassium carbonate was added in small portions over a period of 1 ½ hours. Refluxing was continued for an additional hour. After allowing to cool, 700 ml. of water and 1 l. methylene chloride were added to the reaction mixture. The layers separated, and the organic layer extracted with 3N aqueous sodium hydroxide solution, 5 times with each 150 ml. The alkaline furnished 56 g. recovered isovanilline, upon acidification with 10N sulfuric acid. The product was recovered from the washed methylenechloride layer in a yield of 140 g. (100%) of the theory, conversion 79per cent, showing a melting point of 76°. A sample for analysis was recrystallized from ethanol and melted at 81°–82°.

$C_{10}H_{12}O_4$: Calcd: C, 61.2; H, 6.12. Found: C, 61.46; H, 6.12.

In a like manner, there was prepared 3-ethoxy-4-hydroxyethoxybenzaldehyde from 3-ethoxy-4-hydroxybenzaldehyde.

EXAMPLE 4

Preparation of ethyl-3-methoxy-4-hydroxy-a-cyanocinnamate 152 g. (1 mol) of vanillin, 113 g. (1 mol) of ethylcyanoacetate, 280 ml. ethanol and 10 ml. of piperidine were heated together to 50°–60° for 10 minutes, and the solution (turned orange) subsequently chilled to 10° for 2 hours. The formed crystals were removed by suction filtration and rinsed on the filter with 200 ml. ice-cold ethanol. Recrystallized from 500 ml. of 50% acetic acid, ethyl-3-methoxy-4-hydroxy-α-cyanocinnamate was obtained in yellow crystals, m.p. 109°–110°, in a yield of 238 g. (96.5per cent).

EXAMPLE 5

Preparation of ethyl-3-hydroxy-4-methoxy-α-cyanocinnamate 200 g. (1.32 mol) of isovanillin, 149 g. (1.32 mol) of ethylcyanoacetate, 370 ml. of ethanol and 13 ml. of piperidine were mixed and the mixture was heated to 40°–50° for 15 minutes. It was allowed to cool to room temperature over a period of 1–2 hours and chilled finally to 5°–10° to complete crystallization. Ethyl-3-hydroxy-4-methoxy-α-cyanocinnamate was recrystallized from 50% acetic acid, m.p. 119°–120°, in a yield of 299 g. (92 per cent).

EXAMPLE 6

Preparation of ethyl-3-methoxy-4-hydroxy-α-cyanohydrocinnamate 185 g. (0.75 mol) of ethyl-3-methoxy-4-hydroxy-α-cyanocinnamate in 1,200 ml. of methanol were hydrogenated under a pressure of 800–900 lb. at 20°–25° with 10 g. (5%) of palladium of charcoal. The hydrogenation was terminated within 1 hour. Upon filtration and evaporation, a syrup (184 g.) slowly crystallized over a period of several days to yield ethyl-3-methoxy-4-hydroxy-α-cyanohydrocinnamate, which recrystallized from ethanol, melted at 79°–80°.

EXAMPLE 7

Preparation of d,1-methyl-(α-aminomethyl-3,4-dimethoxyphenthyl) carbamate hydrochloride from ethyl-3,4-dimethoxycyanocinnamate A solution of 195 g. (0.75 mole) of ethyl 3,4-dimethoxycyanocinnamate in 1,200 ml. methanol was hydrogenated using 8 g. of a 10 per cent palladium on charcoal catalyst at room temperature and 700–900 lbs. pressure until 2 moles of hydrogen were absorbed (about 1.5–2 hours). The filtered solution was evaporated in vacuo. The crystalline residue of d,1-ethyl-3,4-dimethoxy-α-cyanodihydrocinnamate had a melting point of 77°.

A mixture of 195 g. (0.75 mole) of d,1-ethyl-3,4-dimethoxy-α-cyanodihydrocinnamate and 95 ml. of 95 per cent hydrazine hydrate solution were slurried until, after a few minutes, with slight evolution of heat a homogeneous solution was obtained. This solution was allowed to stand overnight whereupon the vessel was filled with a crystal mush. This crystal mush was slurried with 100–150 ml. of water, filtered by suction and the crystalline material rinsed with ice cold water. The resulting d,1-3,4-dimethoxy-α-cyanodihydrocinnamic acid hydrazide had a melting point of 131°–133°. A sample recrystallized from water melted at 134°–135°.

A solution of 125 g. (0.5 mole) of d,1-3,4-dimethoxy-α-cyanodihydrocinnamic acid hydrazide in 1,000 ml. of water containing 250 ml. of 3N sufuric acid was stirred at 0°–5°. A solution of 38 g. (0.54 mole) of sodium nitrite, in 80 ml. of water was added dropwise at 0°–5° over a period of ten minutes. An oily azide separated. A total of 1,000 ml. of methylene chloride was added with stirring for another ten minutes. The layers were separated and the aqueous layer extracted twice with fresh methylene chloride with each extraction using 100 ml. of a solvent. The combined methylene chloride extracts were washed two times with 150 ml. of water and then the methylene chloride was dried over anhydrous magnesium sulfate for 15 –30 minutes. After filtration from the magnesium sulfate, the methylene chloride solution of the azide was diluted with 1,250 ml. of absolute methanol and the methylene chloride was distilled off on a steam bath using a fractionating column. When the distilling vapors reached a temperature of 60°, the fractionating column was replaced by a reflux condenser and the heating continued on a steam bath under reflux for six hours. The solution was evaporated in vacuo to a thick syrup and the latter was taken up in 100 ml. of hot isopropanol. Upon standing d,1-methyl-[1-cyano-2-(3,4-dimethoxyphenyl) ethyl] carbamate crystallized. This material had a melting point of 120°.

A charge of 79 g. (0.3 mole) of d,1-methyl-[1-cyano-2-(3,4-dimethoxyphenyl)ethyl]carbamate in 1200 ml. of methanol was hydrogenated over 20 grams of Raney-cobalt catalyst in the presence of 20 ml. of triethylamine. A pressure of about 1,000 pounds and a temperature of about 100°–110° was utilized. The hydrogenation was terminated after 5 to 6 hours. After filtration from the catalyst, the solution was evaporated in vacuo to a syrupy residue. This residue was dissolved in 400 ml. of ethyl acetate and d,1-methyl-(α-aminomethyl-3,4-dimethoxyphenethyl) carbamate hydrochloride was precipitated by the addition of alcoholic hydrochloric acid to a pH of approximately 3. The crystallized hydrochloride was filtered by suction and rinsed with acetone. The above-titled product had a melting point of 158°–160° which remained unchanged upon recrystallization from isopropanol.

EXAMPLE 8

Preparation of Other Carbamate Hydrochlorides Analogous to Example 7

The procedure of Example 7 was repeated with the following indicated starting materials to yield designated novel intermediates and product carbamate hydrochlorides as summarized in the following table:

Starting Material -

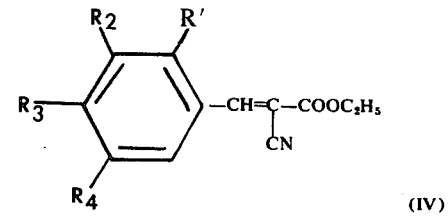

(IV)

| | R' | $R_2$ | $R_3$ | $R_4$ | m.p. |
|---|---|---|---|---|---|
| 1. | H | $OCH_3$ | $OCH_3$ | $OCH_3$ | |
| 2. | H | $OCH_3$ | H | H | |
| 3. | H | H | $OCH_3$ | H | |
| 4. | $OCH_3$ | $OCH_3$ | H | H | |
| 5. | H | $-OCH_2$ | $O-$ | H | |
| 6. | $CH_3$ | H | $OCH_3$ | $OCH_3$ | |
| 7. | $OCH_3$ | H | $OCH_3$ | $OCH_3$ | |
| 8. | H | $OCH_3$ | OH | H | 109–110° |
| 9. | H | OH | $OCH_3$ | H | 119–120° |
| 10. | H | $OC_2H_5$ | OH | H | 129° |
| 11. | H | $OC_2H_5$ | $OCH_3$ | H | 142–143° |
| 12. | H | $OC_4H_9$ | $OCH_3$ | H | 55° |
| 13. | H | $OCH(CH_3)_2$ | $OCH_3$ | H | 102–103° |
| 14. | H | $OCH_2CH_2OH$ | $OCH_3$ | H | 120–122° |
| 15. | H | $OC_2H_5$ | $OCH_2CH_2OH$ | H | 109–110° |

Intermediates -

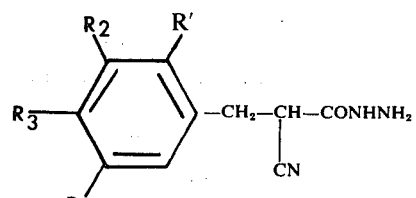

(V)

| | R' | $R_2$ | $R_3$ | $R_4$ | m.p. |
|---|---|---|---|---|---|
| 1. | H | $OCH_3$ | $OCH_3$ | $OCH_3$ | 127° |
| 2. | H | $OCH_3$ | H | H | 105° |
| 3. | H | H | $OCH_3$ | H | 123° |
| 4. | $OCH_3$ | $OCH_3$ | H | H | 126° |
| 5. | H | $-OCH_2O-$ | | H | 147° |
| 6. | $CH_3$ | H | $OCH_3$ | $OCH_3$ | 112–113° |

Intermediates -

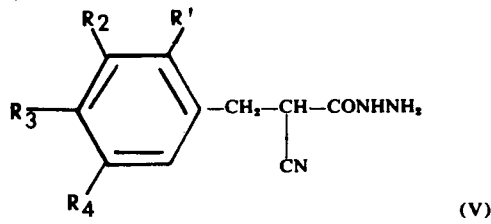

(V)

| | R' | R₂ | R₃ | R₄ | m.p. |
|---|---|---|---|---|---|
| 7. | OCH₃ | H | OCH₃ | OCH₃ | 142–143° |
| 8. | H | OCH₃ | OH | H | 190–191° |
| 9. | H | OH | OCH₃ | H | 193–194° |
| 10. | H | OC₂H₅ | OH | H | 162–163° |
| 11. | H | OC₂H₅ | OCH₃ | H | 158–159° |
| 12. | H | OC₄H₉ | OCH₃ | H | 143–144° |
| 13. | H | OCH(CH₃)₂ | OCH₃ | H | 134–137° |
| 14. | H | OCH₂CH₂OH | OCH₃ | H | 157–158° |
| 15. | H | OC₂H₅ | OCH₂CH₂OH | H | 141–142° |

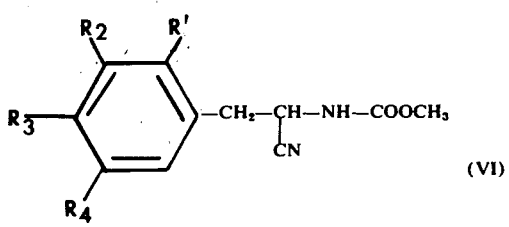

(VI)

| | R' | R₂ | R₃ | R₄ | m.p. |
|---|---|---|---|---|---|
| 1. | H | OCH₃ | OCH₃ | OCH₃ | 114° |
| 2. | H | OCH₃ | H | H | 85° |
| 3. | H | H | OCH₃ | H | 100° |
| 4. | OCH₃ | OCH₃ | H | H | 102° |
| 5. | H | —OCH₂O— | | H | 93° |
| 6. | CH₃ | H | OCH₃ | OCH₃ | 116–117° |
| 7. | OCH₃ | H | OCH₃ | OCH₃ | 118° |
| 8. | H | OCH₃ | OH | H | 126–127° |
| 9. | H | OH | OCH₃ | H | — |
| 10. | H | OC₂H₅ | OH | H | 137–138° |
| 11. | H | OC₂H₅ | OCH₃ | H | 125–126° |
| 12. | H | OC₄H₉ | OCH₃ | H | 101–102° |
| 13. | H | OCH(CH₃)₂ | OCH₃ | H | 89–90° |
| 14. | H | OCH₂CH₂OH | OCH₃ | H | 120° |
| 15. | H | OC₂H₅ | OCH₂CH₂OH | H | 109–110° |

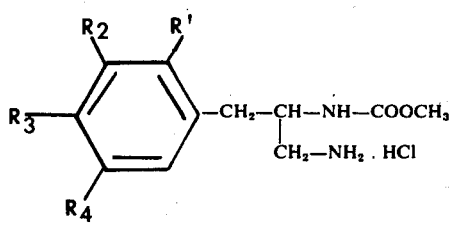

(II)

| | R' | R₂ | R₃ | R₄ | m.p. |
|---|---|---|---|---|---|
| 1. | H | OCH₃ | OCH₃ | OCH₃ | 189° |
| 2. | H | OCH₃ | H | H | 135° |
| 3. | H | H | OCH₃ | H | 206° |
| 4. | OCH₃ | OCH₃ | H | H | not crystalline |
| 5. | H | —OCH₂O— | | H | 225° |

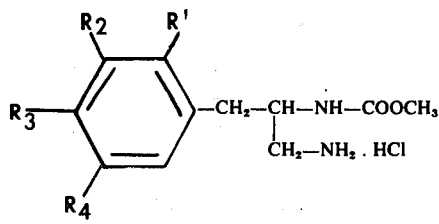

(II)

| | R' | R₂ | R₃ | R₄ | m.p. |
|---|---|---|---|---|---|
| 6. | CH₃ | H | OCH₃ | OCH₃ | 190–191° |
| 7. | OCH₃ | H | OCH₃ | OCH₃ | 145° |
| 8. | H | OCH₃ | OH | H | 225–226° |
| 9. | H | OH | OCH₃ | H | 171–173° |
| 10. | H | OC₂H₅ | OH | H | 154–156° |
| 11. | H | OC₂H₅ | OCH₃ | H | 172–173° |
| 12. | H | OC₄H₉ | OCH₃ | H | 157° |
| 13. | H | OCH(CH₃)₂ | OCH₃ | H | 146° |
| 14. | H | OCH₂CH₂OH | OCH₃ | H | 194° |
| 15. | H | OC₂H₅ | OCH₂CH₂OH | H | 141–142° |

EXAMPLE 9

Preparation of d,1-4-(3,4-dimethoxybenzyl)-2-imidazolidinone

A solution of 72 g. of d,1-methyl-4-(α-aminomethyl-3,4-dimethoxyphenethyl) carbamate hydrochloride in 350 ml. of 3N aqueous sodium hydroxide solution was heated under stirring to 90° for 20 minutes. Upon chilling, the product d,1-4-(3,4-dimethoxybenzyl)-2-imidazolidinone crystallized. Recrystallized from isopropanol, the above-titled product melted at 152°–153°.

$C_{12}H_{16}N_2O_3$ Calcd: C, 61.2; H, 6.78; N, 11.86. Found: C, 61.44; H, 6.86; N, 11.91.

EXAMPLE 10

Preparation of d,1-4-(3,4,5-trimethoxybenzyl)-2-imidazolidinone

A solution of 20 g. of d,1-methyl-4-(α-aminomethyl-3,4,5-trimethoxyphenethyl) carbamate hydrochloride in 200 ml. of 3N aqueous sodium hydroxide was heated to 90° for 30 minutes. Upon chilling, the product crystallized. It was recrystallized from isopropanol to yield the above-titled compound melting at 142°–143°.

$C_{13}H_{18}N_2O_4$ Calcd: C, 58.7; H, 6.76; N, 10.53. Found: C, 58.82; H, 6.73; N, 10.55.

EXAMPLE 11

Preparation of d,1-4-(3-methoxybenzyl)-2-imidazolidinone

A total of 13.5 g. of d,1-methyl-(α-aminomethyl-3-methoxyphenethyl) carbamate hydrochloride were added to a solution of sodium (2.3 g.) in 50 ml. of methanol and the mixture refluxed for 30 minutes. The solvent was removed by evaporation in vacuo and the residue slurried with 100 ml. of water. The product remained undissolved and was recrystallized from isopropanol to yield the above-titled product melting at 101°–102°.

$C_{11}H_{14}N_2O_2$: Calcd: C, 64.1; H, 6.50; N, 13.6. Found: C, 64.00; H, 6.79; N, 13.57.

EXAMPLE 12

Preparation of d,1-4-(4-methoxybenzyl)-2-imidazolidinone

The procedure of Example 9 was employed utilizing d,1-methyl-(α-aminomethyl-4-methoxyphenethyl) carbamate hydrochloride as starting material to yield the above-titled product melting at 150.5°–151°.

$C_{11}H_{14}N_2O_2$: Calcd: C, 64.1; H, 6.80; N, 13.6. Found: C, 64.0; H, 6.77; N, 13.42.

EXAMPLE 13

Preparation of d,1-4-piperonyl-2-imidazolidinone

A total of 29 g. of d,1-methyl-(α-aminomethyl-3,4-methylenedioxyphenethyl) carbamate hydrochloride in 290 ml. of 3N aqueous sodium hydroxide solution was heated at 90°–100° for thirty minutes. The above-titled product separated out and after crystallization from isopropanol melted at 147°.

$C_{11}H_{12}N_2O_3$: Calcd: C, 60.1; H, 5.45; N, 12.7. Found: C, 59.85; H, 5.75; N, 12.62.

EXAMPLE 14

Preparation of d,1-4-(2,3-dimethoxybenzyl)-2-imidazolidinone

A total of 53 g. (0.2 mole) of d,1-methyl-[1-cyano-2-(2,3,-dimethoxyphenyl)ethyl]carbamate was hydrogenated in 1200 ml. of methanol utilizing 14 g. of Raney-cobalt as catalyst in the presence of triethylamine. A pressure in the range of 1000–1200 lbs. and a temperature in the range of 80°–110° were utilized. After termination of the reduction, about 4–6 hours, the filtered solution was evaporated to a syrup. The uncrystallized syrup contained d,1-methyl-(α-aminomethyl-2,3-dimethoxyphenethyl) carbamate. This material was heated with 200 ml. of aqueous 3N sodium hydroxide solution admixed with 75 ml. of methanol for a total of 45 minutes at 80°–90°. Upon chilling, the product crystallized. Recrystallization from isopropanol yielded the above-titled product melting at 140°–141°.

$C_{22}H_{16}N_2O_3$: Calcd: C, 61.2; Hz 6.78; N, 11.86. Found: C, 61.2; H, 6.7; N, 11.79.

EXAMPLE 15

Preparation of d,1-3-(3,4-dimethoxyphenyl)-2-aminopropylamine dihydrochloride

A solution of 7 g. (0.023 mole) of methyl-(α-aminomethyl-3,4-dimethoxyphenethyl) carbamate hydrochloride in 70 ml. of 6N aqueous hydrochloric acid was refluxed for four hours. After evaporation in vacuo, the residue crystallized upon slurring with hot acetone. Recrystallized from methanolether the above-titled product had a melting point of 267°–268°.

EXAMPLE 16

Preparation of d,1-4-(3,4-dimethoxybenzyl)-2-imidazolidinone from d,13-(3,4-dimethoxyphenyl)-2-aminopropylamine A total of 1.4 g. (0.005 moles) of 3-(3,4-dimethoxyphenyl)-2-aminopropylamine dihydrochloride was dissolved in 7.3 ml. of 3N aqueous sodium carbonate solution. To this stirred solution was added dropwise a total of 6 ml. of ten per cent phosgene in toluene. After thirty minutes the precipitated product was filtered and recrystallized from isopropanol to yield the above-titled material melting at 152°–153°. This material was identical to that prepared by the procedure of Example 3.

EXAMPLE 17

Preparation of d,1-4-(3-hydroxybenzyl)-2-imidazolidinone from d,1-methyl-(α-aminomethyl-3-methoxyphenethyl) carbamate hydrochloride A solution containing 13.5 g. (0.05 mole) of d,1-methyl-(α-aminomethyl-3-methoxyphenethyl) carbamate hydrochloride in 135 ml. of 85 per cent aqueous hydrobromic acid was refluxed for three hours. After evaporation in vacuo the residue was slurried with 25 ml. of isopropanol and chilled to crystallization to yield d,1-3-(3-hydroxyphenyl)-2-aminopropylamine dihydrobromide melting point 258°–259°.

9.9 g. (0.03 moles) of the dihydrobromide were dissolved in 48 ml. of 3N aqueous sodium carbonate solution. To this solution was added dropwise under stirring at room temperature a total of 36 ml. of 10 per cent phosgene in toluene solution. Stirring was continued for 2 hours by which time an amorphous precipitate, possibly a polymeric ureide had deposited. It was filtered and the solid returned into the flask. A total of 20 ml. of 3N aqueous sodium hydroxide solution were added and the resulting clear solution heated for 30 minutes on a steam bath. Upon neutralization with about 4 ml. of acetic acid the above-titled product crystallized. It was filtered after chilling and recrystallized from isopropanol to yield material melting at 135°–136°.

$C_{10}H_{12}N_2O_2$: Calcd: C, 62.5; H, 6.25; N, 14.5. Found: C, 62.50; h, 6.41; N, 14.23.

EXAMPLE 18

Preparation of d,1-4-(3,4-dihydroxybenzyl)-2-imidazolidinone from d,1-methyl-(α-aminomethyl-3,4-dimethoxyphenethyl) carbamate hydrochloride A total of 5 g. (0.0164 mole) of d,1-methyl-(α-aminomethyl-3,4-dimethoxyphenethyl)carbamate hydrochloride was refluxed for 4 hours with 50 ml. of 48 per cent aqueous hydrobromic acid. The solution was evaporated in vacuo and the crystalline residue recrystallized from methanol-ether to yield d,1-3-(3,4-dihydroxyphenyl)-2-aminopropylamine dihydrobrimide, melting point 261°.

A total of 13.6 g. (0.04 mole) of the dihydrobromide was dissolved in 66 ml. of 3N aqueous sodium carbonate solution under a nitrogen atmosphere. Then 48 ml. of 10 per cent phosgene in toluene solution were dropped in the stirred solution under exclusion of oxygen and the mixture stirred for an additional thirty minutes. The mixture was saturated with carbon dioxide under cooling and the amorphous solid intermediary collected by filtration. The filter cake was dissolved in aqueous 3N sodium hydroxide solution in an atmosphere of nitrogen and heated under nitrogen for 15 minutes. The solution was then neutralized with 6 ml. of acetic acid and evaporated to dryness in vacuo. The residue was dissolved in 20 ml. of water and the solution cleared by filtration over Celite. The filtrate was adjusted to 40 ml. with additional water and 20 g. of ammonium sulfate were added causing a deposit of an oil, which after standing several days crystallized. Upon recrystallization from water there was obtained product 4-(3,4-dihydroxybenzyl)-2-imidazolidinone of melting point 176°–177°.

This compound was observed to exist in two modifications, one melting at 176° and the second one melting at 194°. The mixed melting point is at 194°. Concentrated aqueous solutions of the lower melting modification gave the higher melting one upon seeding with the latter. Both isomers were found to analyze identically. The isomer melting at 176°–177° is designated isomer A; while the isomer melting at 194°195° is designated isomer B.

$C_{10}H_{12}N_2O_3$: Calcd; C, 57.7; H, 5.77; N, 13.45. Isomer A Found; C, 57.55; H, 5.85; N, 13.48. Isomer B Found; C, 57.75; H, 5.88; N, 13.34.

EXAMPLE 19

Preparation of d,1-4-(3,4-dimethoxybenzyl)-2-imidazolidinone from d,1-3-(3,4-dimethoxyphenyl)-2-iminopropylamine dihydrochloride via the dicarbamate A total of 8.5 g. (0.03 mole) of 3-(3,4-dimethoxyphenyl) -2-iminopropylamine dihydrochloride was dissolved in 48 ml. of 3N aqueous sodium carbonate solution and 6 g. of ethyl chlorocarbonate were dropped into the stirred solution. After 1 hour, the mixture was heated on a steam bath for twenty minutes. A deposited oil crystallized upon chilling. Recrystallized from isopropanol the intermediate N,N′-[3,4-dimethoxybenzyl)ethylene]dicarbamic acid ethyl ester of melting point 105°–106° was obtained.

A total of 0.5 g. (0.022 gramatoms) of sodium was dissolved in 35 ml. of alcohol and to this solution was added 2 g. (0.0056 mole) of the above dicarbamic acid diethyl ester. The mixture was refluxed for one hour and the solution was then evaporated to dryness. The residue was slurried with 15 ml. of water whereupon the undissolved material crystallized to yield 4-(3,4-dimethoxybenzyl)-2-imidazolidinone identical to the material prepared by Example 3.

EXAMPLE 20

Preparation of
d,1-3-(3,4,5-trihydroxyphenyl)-2-aminopropylamine dihydrobromide

A solution containing 20 g. (0.06 mole) of d, 1-methyl-($\alpha$-aminomethyl-3,4,5-trimethoxyphenethyl) carbamate and aqueous hydrobromic acid was refluxed for three hours. The solution was evaporated to dryness and the residue taken up in 40 ml. of hot 48 per cent hydrobromic and seeded. The above-titled product had a melting point of 234°. Upon recrystallization from methanol (1 part)-ether(4 parts) the melting point rose to 236°.

$C_9H_{14}N_2O_3 \cdot 2HBr$: Calcd; C, 30.0; H, 4.45; N, 7.78; Br, 44.5. Found; C, 29.93; H, 4.66; N, 7.59; Br, 44.19.

EXAMPLE 21

Preparation of
d,1-3-(2,3-dihydroxyphenyl)-2-aminopropylamine dihydrobromide

A solution containing 5.3 g. (0.02 mole) of d,1-methyl-[1-cyano-2-(2,3-dimethoxyphenyl)ethyl]carbamate in 120 ml. of methanol were hydrogenated with 2 g. of Raney-cobalt catalyst in the presence of 2 ml. of triethylamine at 1000 pounds pressure and 100°–110° temperature. The hydrogenation was terminated after 5 to 6 hours. After filtration from the catalyst and evaporation, the uncrystallized residue was refluxed with 50 ml. of 48 per cent aqueous hydrobromic acid for three hours. After evaporation in vacuo, the residue was boiled with acetone until it became crystalline. This material melted at 243°. Upon recrystallization from methanol-ether, the above-titled product melting in the range of 241°–243° was obtained.

$C_9H_{14}N_2O_2 \cdot 2HBr$: Calcd; C, 31.4; H, 4.64; Br, 46.4. Found; C, 31.54; H, 4.71; Br, 46.25.

EXAMPLE 22

Preparation of
(−)-4-(3,4-dimethoxybenzyl)-2-imidazolidinone from resolved corresponding carbamate hydrochloride The free base of d,1-methyl-4-($\alpha$-aminomethyl-3,4-dimethoxyphenethyl) carbamate hydrochloride was prepared by stirring 36.6 g. (0.12 mole) of the hydrochloride with 200 ml. of aqueous 3N sodium carbonate solution. The base was extracted three times with ethyl acetate using a total of 400 ml. of the organic solvent. The extract was dried over magnesium sulfate and evaporated in vacuo. A syrupy residue was dissolved in ethyl alcohol 2B, the volume adjusted to 150 ml. and a 1 ml. sample titrated with 0.1 N hydrochloric acid (7.00 ml.) which indicated the presence of 0.105 moles of base.

A solution containing 13.4 g. (0.056 mole) of d-10-camphor sulfonic acid in 30 ml. of ethanol 2B was added, and the solution seeded with pure (−)-methyl-4-($\alpha$-aminomethyl-3,4-dimethoxyphenethyl)carbamate d-10-camphor sulfonate and allowed to crystallize at 0°–5° for 24 hours. The crystals were filtered by suction and rinsed with cold ethyl alcohol 2B using a total of 20 ml. of the alcohol. The product exhibited a melting point of 162°–165° and an $(\alpha)_D^{25} = +14.8$ (2 per cent in methanol). A single crystallization from 120 ml. of ethyl alcohol 2B rendered pure product carbamate D-10-camphor sulfonate having a melting point of 169°–170°, $(\alpha)_D^{25} = +11.4$ (2 per cent in methanol). 15 g. of the resulting above resolved carbamate d-10-camphor sulfonate were dissolved in 3N aqueous sodium hydroxide solution (150 ml.) and the mixture was heated on a steam bath to 90°–100° for 30 minutes. Upon chilling, the deposited crystals were filtered by suction and recrystallized from isopropanol to yield (−)-4-(3,4-dimethoxybenzyl)-2-imidazolidinone having a melting point of 152° and $(\alpha)_D^{25} = -22.379°$ (2 per cent in methanol).

$C_{12}H_{16}N_2O_3$: Calcd; C, 61.2; H, 6.8; N, 11.86. Found; C, 61.08; H, 6.87; N, 11.97.

EXAMPLE 23

Preparation of
(+)-4-(3,4-dimethoxybenzyl)-2-imidazolidinone

The alcoholic filtrate obtained in Example 22 was evaporated in vacuo to a volume of 80 ml. and a solution containing 0.3 g. (0.052 mole) of d-10-camphorsulfonic acid in 2B ethanol was added. After seeding with a pure sample of (+)-methyl-4-($\alpha$-aminomethyl-3,4-dimethoxyphenethyl)carbamate-d-10-camphorsulfonate, crystallization was allowed to proceed at 0°–5°λ for 48 hours. The crystals were filtered by suction and crude (+) carbamate d-10-camphorsulfonate was obtained having a melting point of 161°–170° and an $(\alpha)_D^{25} = +20.4°$(2 per cent in methanol). It was recrystallized first from 150 ml. of ethyl alcohol 2B and subsequently from 200 ml. of isopropanol to yield pure (+)-methyl-4-($\alpha$-aminomethyl-3,4-dimethoxyphenethyl)carbamate-d-10 camphor sulfonate of melting point 181°–182° and $(\alpha)_D^{25} = +26.2°$ (2 per cent in methanol).

The carbamate was hydrolyzed to (+)-4-(3,4-dimethoxybenzyl)-2-imidazolidinone by a procedure analogous to that used in Example 17 for the corresponding step. The product had a melting point of 152° and $(\alpha)_D^{25} = +22.87°$ (2 per cent in methanol).

$C_{12}H_{16}N_2O_3$: Calcd; C, 61.2; H, 6.8; N, 11.86. Found; C, 60.98; H, 7.05; N, 11.95.

EXAMPLE 24

Preparation of
d,1-4-(2-chloro-4,5-dimethoxybenzyl)-2-imidazolidinone

Procedure A

A total of 2.3 g. (0.01 mole) of d,1-4-(3,4-dimethoxybenzyl)-2-imidazolidinone obtained as in Example 3 was dissolved in 20 ml. of acetic acid and 1.4 g. of sulfuryl chloride were added under chilling. After 30 minutes the above-titled product was precipitated with 100 ml. of ice water, filtered and recrystallized from isopropanol. The product melted at 155°–156°.

Procedure B

To a suspension of 11.8 g. (0.05 mole) of d, 1-4-(3,4-dimethoxybenzyl)-2-imidazolidinone in 20 ml. of acetic acid was added 100 ml. of a 1N solution of chlorine in chloroform. The material went rapidly into solution. After evaporation, the residue was slurried with water and recrystallized from isopropanol to yield the above-titled product, melting at 155°–156°.

$C_{12}H_{15}ClN_2O_3$: Calcd; C, 53.2; H, 5.55; N, 10.32; Cl, 13.1. Found; C, 52.88; H, 5.45; N, 9.98; Cl, 13.88.

EXAMPLE 25

Preparation of d, 1-4-(2-bromo-4,5-dimethoxybenzyl)-2-imidazolidinone

To a suspension of 11.8 g. (0.05 mole) of d, 1-4-(3,4-dimethoxybenzyl)-2-imidazolidinone in 20 ml. of acetic acid, was added a solution of 8 g. $Br_2$ in 20 ml. of acetic acid with chilling. After 20 minutes, the product was precipitated with 100–150 ml. ice water, filtered and recrystallized from isopropanol to yield the above-titled product, m.p. 174°.

$C_{12}H_{15}BrN_2O_3$: Calcd; C, 45.7; H, 4.8; N, 8.9; Br, 25.4. Found; C, 45.99; H, 4.58; N, 8.77; Br, 25.43.

EXAMPLE 26

Preparation of d, 1-4-(2-methyl-4,5-dimethoxybenzyl)-2-imidazolidinone

A solution of 9.6 g. (0.03 mole) of d,1-methyl-[1-aminomethyl-2-(2-methyl-4,5-dimethoxyphenol)ethyl]carbamate hydrochloride in 500 ml. of aqueous sodium hydroxide was heated on a steam bath for one hour at 90°–95°. The product was collected by filtration after chilling and recrystallized from isopropanol to yield the above-titled product, having a melting point of 169°–170°.

$C_{13}H_{18}N_2O_3$: Calcd; C, 62.3; H, 7.20; N, 11.20. Found; C, 62.07; H, 7.17; N, 10.91.

EXAMPLE 27

Preparation of d, 1-4-(2,4,5-trimethoxybenzyl)-2-imidazolidinone

A solution of 16.7 g (0.05 mole) of d, 1-methyl[1-aminomethyl-2-(2,4,5-trimethoxyphenol)ethyl]carbamate hydrochloride in 80 ml. aqueous 3N sodium hydroxide was heated on a steam bath at 90°–100° for one and one-half hours. The above-titled product crystallized upon chilling and had a melting point of 162°–163°.

$C_{13}H_{18}N_2O_4$: Calcd; C, 58.6; H, 6.77; N, 10.53. Found; C, 58.60; H, 6.78; N, 10.31.

EXAMPLE 28

Preparation of 4-(3-methoxy-4-hydroxybenzyl)-2-imidazolidinone 5.8 g. (0.02 mol) of methyl-[1-aminomethyl-2-(3-methoxy-4-hydroxyphenyl)-ethyl]-carbamate hydrochloride was added in one portion to aqueous 3N sodium hydroxide solution at 0°–10°. The solution was allowed to stand overnight at room temperature (20°–25°). It was neutralized with 10.2 ml. acetic acid and the product allowed to crystallize for 24 hours, 3 g. An additional crop of 0.5 g. was obtained from the mother liquor upon salting out with ammonium sulfate (3 g. per 10 ml. filtrate). Recrystallized from water or isopropanol, 4-(3-methoxy-4-hydroxybenzyl)-2-imidazolidinone melted at 147°–148°.

$C_{11}H_{14}N_2O_3$: Calcd; C, 59.44; H, 6.36; N, 12.60. Found; C, 59.48; H, 6.22; N, 12.37.

EXAMPLE 29

Preparation of 4-(3-hydroxy-4-methoxybenzyl)-2-imidazolidinone 5.8 g. of methyl-[1-aminomethyl-2-(3-hydroxy-4-methoxyphenyl) ethyl]carbamate hydrochloride were dissolved in 3N aqueous sodium hydroxide solution at 0°–10°, and the solution allowed to stand for 12 hours at room temperature and for 10–15 minutes at 50°. The product was isolated in 77 per cent yield as described in exp. 9, m.p. 198°–199°.

$C_{11}H_{14}N_2O_3$ : Calcd; C, 59.44; H, 6.36; N, 12.60. Found; C, 59.20 H, 6.43; N, 12.51.

EXAMPLE 30

Preparation of 4-(3-methoxy-4-ethoxybenzyl)-2-imidazolidinone

A total of 2.2 g. of 4-(3-methoxy-4-hydroxybenzyl)-2-imidazolidone (exp. 28) was dissolved in 6.6 ml. of 3N NaOH and the resulting solution was stirred with 1.7 g. of diethyl sulfate at 35°–45°C. for 30 minutes. The solution was then chilled to 20°C. with stirring during which time an oily precipitate which appeared, slowly crystallized. The crystals were filtered off and were recrystallized first from water and then from ethyl acetate to yield 2.2 g. of 4-(3-methoxy-4-ethoxybenzyl)-2-imidazolidinone, having a melting point of 137°–138°C.

EXAMPLE 31

Preparation of 4-(3-ethoxy-4-methoxybenzyl)-2-imidazolidinone a. 11 g. of 4-(3-hydroxy-4-methoxybenzyl)-2-imidazolidinone dissolved in 33 ml. of 3N aqueous sodium hydroxide solution and 8.5 g. of diethylsulfate were dropped into the stirred solution over a period of 1 hour. The product crystallized. It was filtered by suction and rinsed with cold water. Recrystallized from isopropanol, there was obtained 8 g. of 4-(3-ethoxy-4-methoxybenzyl)-2-imidazolidinone, having a melting point of 108°C.

b. 8 g. (0.034 mol) of 4-(3-ethoxy-4-hydroxybenzyl)-2-imidazolidinone, dissolved in 23 ml. of 3N aqueous sodium hydroxide solution and 5 g. of dimethylsulfate under the conditions described in procedure (a) gave 6 g. of 4-(3-ethoxy-4-methoxybenzyl)-2-imidazolidinone, having a melting point of 108°C.

EXAMPLE 32

Preparation of 4-(3-ethoxy-4-hydroxybenzyl)-2-imidazolidinone from dl-methyl-[1-aminomethyl-2-(3-ethoxy-4-hydroxyphenyl)-ethyl]carbamate hydrochloride 30.5 g. (0.1 mol) of dl-methyl-[1-aminomethyl-2-(3-ethoxy-4-hydroxyphenyl)ethyl]carbamate hydrochloride were added in portions under nitrogen to a stirred 3N aqueous sodium hydroxide solution. The solution was allowed to stand for 2 days at room temperature. Upon neutralization with 54 ml. of acetic acid, 21 g. (89%) of 4-(3-ethoxy-4-hydroxybenzyl)-2-imidazolidinone precipitated. Upon recrystallization from isopropanol, the product was obtained as off-white crystals having a melting point of 168°–169°.

EXAMPLE 33

Preparation of 4-(3,4-diethoxybenzyl)-2-imidazolidinone 9 g. (0.038 mol) of 4-(3-ethoxy-4-hydroxybenzyl)-2-imidazolidinone were dissolved in 25 ml. of 3N aqueous sodium hydroxide solution and 6.4 g. (0.054 mol) were dropped into the stirred solution at 40°–45° over a period of 1 hour. The product crystallized and was filtered by suction to yield 7.8 g. (78 percent of theory) having a melting point of 104°–109°. Recrystallized from isopropanol, there was obtained 6 g. of 4-(3,4-diethoxybenzyl)-2-imidazolidinone, having a melting point of 112°C.

EXAMPLE 34

Preparation of 4-(3-ethoxy-4-methoxybenzyl)-imidazolidinone from dl-methyl-[1-aminomethyl-2-(3-hydroxy-4-methoxyphenyl)ethyl] carbamate hydrochloride 35 g. (0.11 mol) of dl-methyl-[1-aminomethyl-2-(3-ethoxy4-methoxyphenyl)ethyl]carbamate hydrochloride were stirred with 3N aqueous sodium hydroxide solution at 90°–95° for 15 minutes and subsequently at room temperature for 24 hours. The crystalline product was filtered by suction and recrystallized from ethyl acetate to yield 2.55 g. (90%) of 4-(3-ethoxy-4-methoxybenzyl)-imidazolidinone, having a melting point of 108°.

EXAMPLE 35

Preparation of dl-4-(3-butoxy-4-methoxybenzyl)-2-imidazolidinone from dl-methyl-[1-aminomethyl-2-(3-butoxy-4-methoxyphenyl)ethyl]-carbamate hydrochloride 48 g. (0.138 mol) of dl-methyl[1-aminomethyl-2-(3-butoxy-4-methoxyphenyl)ethyl]carbamate hydrochloride in 480 ml. of 3N aqueous sodium hydroxide solution were heated with stirring at 95°–100° for 45 minutes. The product crystallized upon chilling. Upon recrystallization from isopropanol, there was obtained 19 g. (49 percent yield) of dl-4-(3-butoxy-4-methoxybenzyl)-2-imidazolidinone having a melting point of 126°.

$C_{15}H_{22}N_2O_3$: Calcd; C, 64.73; H, 7.97; N, 10.06. Found; C, 64.82; H, 8.14; N, 10.11.

EXAMPLE 36

Preparation of dl-4-(3-isopropoxy-4-methoxybenzyl)-2-imidazolidinone from dl-methyl-[1-aminomethyl-2-(3-isopropoxy-4-methoxyphenyl)ethyl]carbamate hydrochloride In an analogous manner to Example 35, dl-methyl-]1-aminomethyl-2-(3-isopropoxy-4-methoxyphenyl)ethyl]carbamate hydrochloride gave dl-4-(3-isopropoxy-4-methoxybenzyl)-2-imidazolidinone, which after recrystallization from water, had a melting point of 119°.

EXAMPLE 37

Preparation of dl-4-(3-hydroxyethoxy-4-methoxybenzyl)-2-imidazolidinone from dl-methyl-[1-aminomethyl-2-(3-hydroxyethoxy4-methoxyphenyl)ethyl]carbamate hydrochloride 36.5 g. (0.109 mol) of dl-methyl-[1-aminomethyl-2-(3-hydroxyethoxy-4-methoxyphenyl)ethyl]carbamate hydrochloride were dissolved in 365 ml. of 3N aqueous sodium hydroxide solution, and the solution was allowed to stand for 24 hours. Thereafter, 100 g. of potassium carbonate were added in order to salt out the product. It was allowed to crystallize for 24 hours. Thereafter, the mixture was filtered by suction and recrystallized from toluene to yield 16 g. (55%) of dl-4-(3-hydroxyethoxy-4-methoxybenzyl)-2-imidazolidinone having a melting point of 129°C.

$C_{13}H_{18}N_2O_4$: Calcd; C, 58.63; H, 6.81; N, 10.52. Found; C, 58.76; H, 6.79; N, 10.57.

EXAMPLE 38

Preparation of dl-(3-ethoxy-4-hydroxyethoxybenzyl)-2-imidazolidinone from dl-methyl-[1-aminomethyl-2-(3-ethoxy-4-hydroxyethoxyphenyl)ethyl]carbamate hydrochloride 31 g. (0.1 mol) of dl-methyl-[1-aminomethyl-2-(3-ethoxy-4-hydroxyethoxyphenyl)ethyl]carbamate hydrochloride were dissolved in 100 ml. of water at 50°–60°C. and upon cooling, 60 ml. of 3N aqueous sodium hydroxide solution were added. The mixture was allowed to stand for 48 hours. Thereafter, it was saturated with 130 g. of anhydrous potassium carbonate and extracted repeatedly with chloroform, about 250 ml. The extract was slurried with 80 g. of Celite, evaporated and dried, and the Celite adsorbant was extracted with toluene on an extraction thimble. The crystalline dl-(3-ethoxy-4-hydroxyethoxybenzyl)-2-imidazolidinone had a melting point of 106°–107°.

$C_{14}H_{20}N_2O_4$: Calcd; C, 59.98; H, 7.19; N, 9.99. Found; C, 60.21; H, 7.28; N, 10.05.

EXAMPLE 39

Pharmacological tests of 3-(substituted phenyl)-2-aminopropylamine dihydrochloride The following compounds were tested for cardiovascular activity in a series of standard screening tests:

d,1-3-(3-hydroxyphenyl)-2-aminopropylamine (Compound A)

d, 1-3-(3,4-dihydroxyphenyl)-2-aminopropylamine (Compound B)

d, 1-3-(2,3-dihydroxyphenyl)-2-aminopropylamine (Compound C)

d, 1-3-(3,4,5-trihydroxyphenyl)-2-aminopropylamine (Compound D)

The tests involved determining responses in subject animals to serotonin, vagus stimulation, carrotis occlusion, hypertensine, N-epinephrine, and hystamine. The subject screening test utilized one anesthetized (30 mg/kg, sodium pentobarbital) artificially respired (Palmer Pump) dog. The femoral arterial blood pressure and respiratory resistance (measured in terms of pressure) were recorded on a direct writing oscillegraphic recorder. A series of "control" responses of the blood pressure and respiration were obtained and duplicated. The "control" procedures used are: intravenously administered norepinephrine (1γ/kg), histamine (1γ/kg), serotonin (25γ/kg), and hypertensine (0.5γ/kg), as well as the bilateral occlusion of the carotid arteries and the electrical stimulation of the central portion of a severed vagus nerve (5 V, 50 c.p.s., 10 seconds). Each of the control procedures is administered at 5-minute intervals. Five minutes after the series of control responses, the drug to be tested is intravenously administered and its effects recorded. The series of control procedures is repeated after dosing to determine the effect of the compound on these standard responses. If the control responses are unaltered by the test drug, a second compound is administered and the procedure repeated. If the test compound alters the blood pressure or the control responses, the control procedures are repeated at convenient intervals until the animal has returned to its predose status or a new physiological status is established. The parameters measured include change in blood pressure (mmHg) and duration in minutes. The following terms are utilized to indicate dosage effect: inhibition (INH), potentiation (AT), moderate (MO), slight (SL), and marked (MK) and no effect (NE). The results obtained in the above screening tests are summarized below in the following table:

TABLE II

CARDIOVASCULAR SCREENING TESTS

| Compound | Blood Pr. | Serotonin | Central Vagus Stimulation | Carrotis Occlusion | Hypertensine | N-epinephrine | Hystamine |
|---|---|---|---|---|---|---|---|
| A | +130, 5 min. | MK INH | MK INH | Block. | S1 INH | MK INH | N.E. |
| B | +90, 5 min. | MK INH | N.E. | Mo INH | MO POT | SL INH | MK INH |
| C | +150 10 min. | N.E. | N.E. | N.E. | SL INH | MO INH | SL INH |
| D | +75, 4 min. | SL INH | N.E. | SL INH | N.E. | MO INH | N.E. |

The above results clearly demonstrate that compounds A, B, C and D exhibit strong hypertensive effects for the durations indicated.

EXAMPLE 40

Parenteral Formulation

|  | Per cc |
|---|---|
| 4-(3,4-Dimethoxybenzyl)-2-imidazolidinone | 5.0 mg |
| Propylene Glycol | 0.4 cc |
| Benzyl Alcohol (Benzaldehyde free) | 0.15 cc |
| Ethanol 95% U.S.P. | 0.1 cc |
| Water for Injection q.s. | 1.0 cc |

Procedure (For 10,000 cc):
1. The 50 grams of 4-(3,4-dimethoxybenzyl)-2-imidazolidinone were dissolved in the benzyl alcohol; 4,000 cc of propylene glycol and 1,000 cc of ethanol were added.
2. The solution was brought up to final volume of 10.000 cc with Water for Injection.
3. The solution was filtered through an 0.2 Selas candle, filled into suitable size ampuls, gassed with nitrogen and sealed.

EXAMPLE 41

Parenteral Formulation

| Each 1 cc ampul contains: | Per cc |
|---|---|
| 4-(3,4-Dimethoxybenzyl)-2-imidazolidinone | 5.1 mg |
| Benzyl Alcohol | 0.1 cc |
| Water for Injection, U.S.P. q.s. ad | 1 cc |

Procedure (For 10,000 cc):
1. In a clean glass or glass-lined vessel, 8,000 cc of Water for Injection were heated to 90°C. It was then cooled to 50°–60°C, and benzyl alcohol was added and dissolved with stirring. The solution was then allowed to cool to room temperature.
2. The 51.0 g. of 4-(3,4-dimethoxybenzyl)-2-imidazolidinone were added under an atmosphere of nitrogen and stirred until completely dissolved.
3. Sufficient Water for Injection was then added to make a total volume of 10,000 cc.
4. This solution was then filtered through an 02 Selas candle, filled into suitable size ampuls, gassed with nitrogen and sealed.

EXAMPLE 42

Tablet Formulation

|  | Per Tablet |
|---|---|
| 4-(3,4-Dimethoxybenzyl)-2-imidazolidinone | 10.0 mg |
| Lactose | 113.5 mg |
| Corn Starch | 70.5 mg |
| Pregelatinized Corn Starch | 8.0 mg |
| Calcium Stearate | 3.0 mg |
| Total Weight | 205.0 mg |

Procedure
1. 4-(3,4-Dimethoxybenzyl)-2-imidazolidinone was mixed with the lactose, corn starch and pregelatinized corn starch in a suitable size mixer.
2. The mix was passed through a Fitzpatrick Comminuting machine fitted with No. 1A screen and with knives forward.
3. The mix was returned to the mixer and moistened with water to a thick paste. The moist mass was passed through a No. 12 screen and the moist granules were dried on paper lined trays at 110°F.
4. The dried granules were returned to the mixer, the calcium stearate was added and mixed well.
5. The granules were compressed at a tablet weight of 200 mg. using standard concave punches having a diameter of 5/16 inches.

EXAMPLE 43

Tablet Formulation

|  | Per Tablet |
|---|---|
| 4-(3,4-Dimethoxybenzyl)-2-imidazolidinone | 25.00 mg |
| Lactose, U.S.P. | 64.50 mg |
| Corn Starch | 10.00 mg |
| Magnesium Stearate | 0.50 mg |

Procedure:
1. 4-(3,4-Dimethoxybenzyl)-2-imidazolidinone was mixed with the lactose, corn starch and magnesium stearate in a suitable mixer.
2. The mixture was further blended by passing through a Fitzpatrick Comminuting Machine fitted with a No. 1A screen with knives forward.
3. The mixed powders were slugged on a tablet compressing machine.
4. The slugs were comminuted to a suitable mesh size (No.16 screen) and mixed well.
5. The tablets were compressed at a tablet weight of 100 mg using tablet punches having a diameter of

EXAMPLE 44

Capsule Formulation

|  | Per Capsule |
|---|---|
| 4-(3,4-Dimethoxybenzyl)-2-imidazolidinone | 25 mg |
| Lactose | 158 mg |
| Corn Starch | 37 mg |
| Talc | 5 mg |
| Total Weight | 225 mg |

Procedure:
1. 4-(3,4-Dimethoxybenzyl)-2-imidazolidinone was mixed with the lactose and corn starch in a suitable mixer.
2. The mixture was further blended by passing through a Fitzpatrick Comminuting Machine with a No. 1A screen with knives forward.
3. The blended powder was returned to the mixer, the talc added and blended thoroughly. The mixture was then filled into No. 4 hard shell gelatin capsules on a Parke Davis capsulating machine. (Any similar type machine may be used.)

EXAMPLE 45

Capsule Formulation

|  | Per Capsule |
|---|---|
| 4-(3,4-Dimethoxybenzyl)-2-imidazolidinone | 50 mg |
| Lactose, U.S.P. | 125 mg |
| Corn Starch, U.S.P. | 30 mg |
| Talc, U.S.P. | 5 mg |
| Total Weight | 210 mg |

Procedure:
1. 4-(3,4-Dimethoxybenzyl)-2-imidazolidinone was mixed with lactose and corn starch in a suitable mixer.
2. The mixture was further blended by passing through a Fitzpatrick Comminuting Machine with a No. 1A screen with knives forward.
3. The blended powder was returned to the mixer, the talc added and blended thoroughly.
4. The mixture was filled into #4 hard shell gelatin capsules on a Parke Davis capsulating machine.

EXAMPLE 46

This example demonstrates the cardiovascular effects of d,1-4-(3,4-dimethoxybenzyl)-2-imidazolidinone (Compound E) of the present invention when utilized in a standard test in dogs.

Blood flow and vascular resistance were measured in the renal and femoral vascular beds. Blood flow was measured in the mesenteric artery; resistance was measured across the splanchnic bed. Systemic blood flow and resistance were measured from the ascending aorta. Total peripheral resistance was calculated by using the formula $$\frac{\text{arterial pressure}}{\text{flow}} \times 100 = PRU.$$

Resistance across the splanchnic bed was calculated separately by using the formula $$\frac{\text{venous portal pressure} - \text{arterial pressure}}{\text{Mesenteric flow}} \times 100 = PRU.$$

Flows and resistances were determined at 5 minutes and then at 15 minute intervals after drug administration for a period of two hours after the intravenous administration of Compound E, 10 mg/kg. Systemic flow (aortic flow — coronary flow) was monitored in the open chest dog under artificial respiration using a Palmer pump. In the same animals electrocardiograms were recorded from lead II and recorded on a Sanborn direct writing polygraph.

Mongrel dogs of either sex were used in the study. Each flow parameter was measured in four dogs. A combination of sodium barbital, 300 mg/kg and pentobarbital, 15 mg/kg, i.v., was used as an anesthetic agent. Arterial blood pressure was monitored by passing a polyethylene catheter into the aorta via the left carotid artery. Portal pressure was monitored by passing a polyethylene catheter into the portal vein through the splenic vein. All pressure parameters were sensed with appropriate Statham pressure transducers and recorded on a Sanborn direct writing polygraph.

Blood flow in the various vascular beds was monitored with a Statham Multiflo Model M-4000 modular electromagnetic flow meter. Blood flow was sensed with appropriate Statham flow probes. All blood flows were recorded on a Sanborn direct writing polygraph.

A definitive drug effect in diminishing venous return is reflected in a decreased stroke volume and an increase in systemic resistance. When a reduction in arteriolar tone predominates, total peripheral resistance will decrease; when a reduction in venous tone predominates total peripheral resistance either remains the same or increases. The fall in stroke volume and progressive increase in systemic resistance indicates that Compound E produces venous pooling in spite of the fact that portal pressure shows little change from control values. However, some of the decrease in stroke volume may be related to a decrease in filling time because of the drug induced tachycardia. The diminished blood flow in the renal and femoral beds is probably related to the diminished systemic output; the increase in resistance in these beds may be related to the peripheral vessels reaching critical closure. It is interesting that the splanchnic bed shows a selective increase in blood flow along with a decrease in peripheral resistance during the major course of drug response since the splanchnic bed is the largest of the regional circulations and is the main resistance bed.

The data obtained from the above test is summarized in the following tables:

Average Arterial Pressure, Right Femoral Flow and Femoral Peripheral Resistance in Four Dogs

| Minutes Post Drug | Average Blood Pressure | Right Femoral Flow (cc/min.) | Femoral PRU |
|---|---|---|---|
| Control | 121 | 57 | 210 |
| 5 | 131 | 62 | 220 |
| 15 | 122 | 59 | 214 |
| 30 | 123 | 56 | 237 |
| 45 | 120 | 43 | 293 |
| 60 | 111 | 38 | 301 |
| 75 | 112 | 41 | 289 |
| 90 | 104 | 30 | 347 |
| 105 | 102 | 25 | 430 |
| 120 | 105 | 29 | 401 |

Average Arterial Pressure, Left Renal Flow and Renal Peripheral Resistance in Four Dogs

| Minutes Post Drug | Average Blood Pressure | Left Renal Flow (cc/min) | Renal PRU |
|---|---|---|---|
| Control | 130 | 45 | 301 |
| 5 | 122 | 44 | 299 |
| 15 | 112 | 38 | 367 |
| 30 | 109 | 39 | 337 |
| 45 | 106 | 38 | 355 |
| 60 | 95 | 34 | 418 |
| 75 | 91 | 32 | 487 |
| 90 | 95 | 34 | 420 |
| 105 | 94 | 30 | 442 |
| 120 | 98 | 31 | 431 |

Average Portal Pressure In Four Dogs

| Minutes Post Drug | Average Portal Pressure mm $H_2O$ |
|---|---|
| Control | 69 |
| 5 | 104 |
| 15 | 80 |
| 30 | 76 |
| 45 | 70 |
| 60 | 64 |
| 75 | 74 |
| 90 | 79 |
| 105 | 72 |
| 120 | 73 |

Average Arterial Blood Pressure, Heart Rate, Systemic Flow, Stroke Volume and Systemic Peripheral Resistance in Four Dogs

| | Average Blood Pressure | Systemic Flow cc/min. | Systemic PRU | Heart Rate (BPM) | Stroke Volume |
|---|---|---|---|---|---|
| Control | 90 | 845 | 11 | 158 | 5 |
| 5 | 80 | 1155 | 7 | 212 | 6 |
| 15 | 89 | 1100 | 9 | 211 | 6 |
| 30 | 90 | 983 | 10 | 204 | 5 |
| 45 | 79 | 713 | 13 | 202 | 4 |
| 60 | 71 | 566 | 15 | 193 | 3 |
| 75 | 74 | 573 | 14 | 196 | 3 |
| 90 | 75 | 559 | 15 | 200 | 3 |
| 105 | 74 | 492 | 17 | 201 | 3 |
| 120 | 71 | 423 | 19 | 205 | 2 |

Average Arterial Pressure, Mesenteric Flow and Resistance Across the Splanchnic Bed in Four Dogs

| Time | Average Blood Pressure | Mesenteric Flow | Splanchnic PRU |
|---|---|---|---|
| Control | 124 | 127 | 112 |
| 5 | 99 | 191 | 60 |
| 15 | 116 | 177 | 85 |
| 30 | 107 | 179 | 84 |
| 45 | 93 | 169 | 82 |
| 60 | 92 | 170 | 87 |
| 75 | 101 | 169 | 92 |
| 90 | 101 | 168 | 98 |
| 105 | 98 | 172 | 100 |
| 120 | 104 | 162 | 134 |

Examination of the above tables indicate that Compound E produced a fall in systemic output, renal flow and femoral flow along with an increase in systemic resistance, renal resistance and femoral resistance. Mesenteric flow increased and splanchnic resistance decreased during the major course of drug action. The directional change in monitored flow parameters indicated some drug induced peripheral pooling despite only minor changes in portal pressure. Stroke volume decreased; however, this may in part be related to the tachycardia produced by Compound E.

EXAMPLE 47

This example demonstrates the blood pressure effects of d,1-4-(3-ethoxy-4-methoxybenzyl)-2-imidazolidinone (compound F) of the present invention when utilized in a standard test in hypertensive rats:

The test procedure comprises the use of 150-170 gran female Charles River rats. DOCA hypertension is induced by unilateral nephrectomy accompanied by a subcutaneous implantation of a 25 mg. desoxycorticosterone pellet. Animals are placed in individual cages with 0.90% sodium chloride solution for drinking water and with rat chow diet ad libitum. Two weeks are allowed to elapse from the time of surgery before the animals are tested. By this time the majority of animals have developed hypertension, i.e., systolic blood pressure of at least 150 mm Hg. The testing procedure consists of subcutaneous or oral administration of a drug to each of six rats, and monitoring of blood pressure and heart rate. Systolic blood pressure and heart rate are measured indirectly from the tail of the unanesthetized rats, restrained in holders and heated for 5-10 minutes at 37°-38°C., using pneumatic pulse transducer coupled to a two channel recorder. Control readings are taken prior to drug and at 1, 2, 4 and 6 hours post drug. Percent changes from normal. Percent changes of 15 percent considered significant. When d,1-4-(3-ethoxy-4-methoxybenzyl)-2-imidazolidinone is used as the test compound, at doses of 3, 10, 20 and 50 mg/kg., the blood pressure of the test animals is lowered up to 6 hours.

Furthermore, the compounds of formula I of the invention produce positive inotropic and chronotropic effects as well as peripheral vasodilation even in the presence of full β-adrenergic block. Yet, they are not direct β-adrenergic energizers. The foregoing effect is due to their unique inhibition of cyclic phosphodiesterase. The compounds of formula I in addition to their usefulness as hypotensive agents, have utility in the area of toxic β-adrenergic blockade, cardiogenic shock and in the therapy of the Stokes-Adam syndrome.

We claim:
1. A compound of the formula

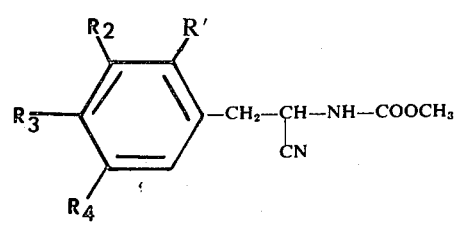

VI where
R' is hydrogen, lower alkyl and lower alkoxy;
$R_2$, $R_3$ and $R_4$ taken independently of each other are hydrogen, hydroxy and lower alkoxy and
R', $R_2$, $R_3$ and $R_4$ taken as an adjacent pair is methylenedioxy.

* * * * *